United States Patent
Teng et al.

(10) Patent No.: US 10,698,720 B2
(45) Date of Patent: Jun. 30, 2020

(54) HARDWARE CONTROL METHOD AND HARDWARE CONTROL SYSTEM

(71) Applicant: MStar Semiconductor, Inc., Hsinchu Hsien (TW)

(72) Inventors: Hsiang-Sheng Teng, Hsinchu Hsien (TW); Chien-Hsing Huang, Hsinchu Hsien (TW)

(73) Assignee: MEDIATEK INC., Hsinchu (TW)

( * ) Notice: Subject to any disclaimer, the term of this patent is extended or adjusted under 35 U.S.C. 154(b) by 188 days.

(21) Appl. No.: 16/046,197

(22) Filed: Jul. 26, 2018

(65) Prior Publication Data

US 2019/0213028 A1 Jul. 11, 2019

(30) Foreign Application Priority Data

Jan. 8, 2018 (TW) .............................. 107100628 A (51) Int. Cl.
*G06F 9/455* (2018.01)
*G06F 9/48* (2006.01)
*G06F 12/02* (2006.01)

(52) U.S. Cl.
CPC ............ *G06F 9/45558* (2013.01); *G06F 9/48* (2013.01); *G06F 12/02* (2013.01); *G06F 2009/45583* (2013.01)

(58) Field of Classification Search
CPC ............. G06F 12/0646; G06F 12/1009; G06F 12/1036; G06F 2212/651; G06F 12/02; G06F 12/06; G06F 12/10; G06F 2009/45583; G06F 2212/657
See application file for complete search history.

(56) References Cited

U.S. PATENT DOCUMENTS

| 6,125,430 A | 9/2000 | Noel et al. |
| 8,909,894 B1 * | 12/2014 | Singh ...................... G06F 11/00 711/170 |
| 2003/0088752 A1 | 5/2003 | Harman |

(Continued)

FOREIGN PATENT DOCUMENTS

| CN | 106203082 A | 12/2016 |
| EP | 1 870 813 B1 | 1/2013 |

*Primary Examiner* — Dong U Kim
(74) *Attorney, Agent, or Firm* — McClure, Qualey & Rodack, LLP (57) ABSTRACT

A hardware control method and a hardware control system. The hardware control method is for an operating system to control at least one function circuit. The hardware control method includes: converting a first virtual address and a second virtual address from the operating system to a first intermediate address and a second intermediate address, respectively; converting the first intermediate address and the second intermediate address to a first extended physical address and a second extended physical address, respectively, wherein a starting position of the first extended physical address is distanced by a gap from a starting position of the second extended physical address; and converting the first extended physical address and the second extended physical address to a first hardware physical address and a second hardware physical address, respectively, wherein the first hardware physical address is adjacent to the second hardware physical address.

18 Claims, 6 Drawing Sheets

(56) References Cited

U.S. PATENT DOCUMENTS

| | | | |
|---|---|---|---|
| 2012/0079458 A1* | 3/2012 | Williams | G06F 9/30189 |
| | | | 717/124 |
| 2016/0070652 A1* | 3/2016 | Sundararaman | G06F 3/0619 |
| | | | 711/154 |
| 2016/0283396 A1* | 9/2016 | Ter-Grigoryan | G06F 12/1009 |
| 2018/0101480 A1* | 4/2018 | Abhishek Raja | G06F 12/1027 |
| 2018/0173645 A1* | 6/2018 | Parker | G06F 12/1458 |
| 2019/0026232 A1* | 1/2019 | Warkentin | G06F 9/45558 |

\* cited by examiner

HARDWARE CONTROL METHOD AND HARDWARE CONTROL SYSTEM

This application claims the benefit of Taiwan application Serial No. 107100628, filed Jan. 8, 2018, the subject matter of which is incorporated herein by reference.

BACKGROUND OF THE INVENTION

Field of the Invention

The invention relates to a control method and a control system, and more particularly to a hardware control method and a hardware control system for a switch controlled by a virtual machine.

Description of the Related Art

In response to information security requirements, permissions of various function circuits need to be controlled. That is, for different corresponding operating systems, only required function circuits are enabled, whereas function circuits not permitted to be used are disabled.

Figure 1:
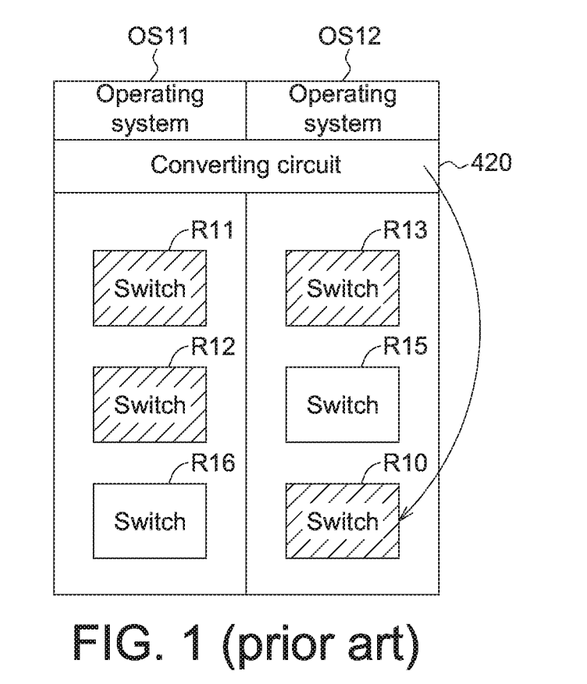
FIG. 1 (prior art) is a schematic diagram of a corresponding relationship between operating systems and switches.

Referring to FIG. 1, FIG. 1 shows a schematic diagram of a conventional corresponding relationships of operating systems OS11 and OS12 in regard to switches R10, R11, R12, R13, R15 and F16. Each of the switches R10, R11, R12, R13, R15 and R16 corresponds to some or all of the functions of specific function circuits. The operating system OS11 corresponds to a function circuit available thereto, and is permitted to use switches R11, R12 and R16; the operating system OS12 corresponds to a function circuit available thereto, and is permitted use to the switches R13, R15 and R10.

Figure 2:
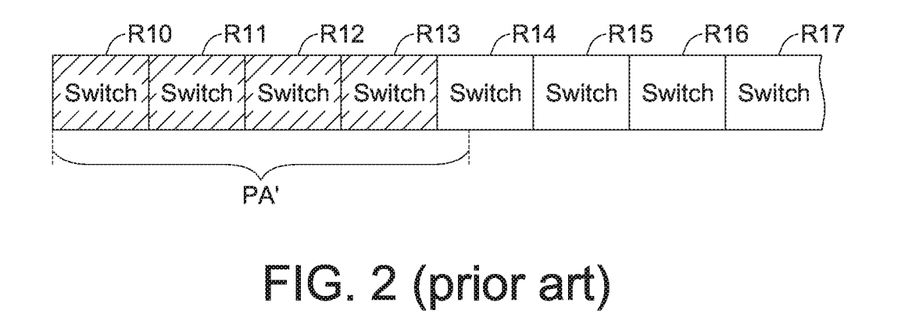
FIG. 2 (prior art) is a schematic diagram of a corresponding relationship between multiple switches and multiple hardware physical addresses.

As shown in FIG. 1, a converting circuit 420 learns that, according to the control command of the operating system OS12, the switch R10 is permitted to be used. FIG. 2 shows a schematic diagram of a corresponding relationship between switches R10 to R17 and a hardware physical address PA'. The hardware physical address PA' corresponds to one page size. When a switch is controlled in conjunction with a virtual machine, the operation of the converting circuit 420 is performed by using one page size as a unit. Thus, the hardware physical address PA' that the converting circuit 420 provides for the switch R10 at the same time corresponds to the expectantly disabled switches R11 and R12, such that some or all of the functions of the expectantly disabled function circuits are now permitted to be used, resulting in information security loopholes.

SUMMARY OF THE INVENTION

The present invention is directed to a hardware control method and a hardware control system, which use a design of extended physical addresses to have a control command provided by an operating system to activate only one switch without activating other expectantly disabled switches, thus avoiding information security loopholes.

According to an aspect of the present invention, a hardware control method for an operating system to control at least one function circuit is provided. The hardware control method includes: converting a first virtual address and a second virtual address from the operating system to a first intermediate address and a second intermediate address, respectively; converting the first intermediate address and the second intermediate address to a first extended physical address and a second extended physical address, respectively, wherein a starting position of the first extended physical address is spaced by a gap from a starting position of the second extended physical address; converting the first extended physical address and the second extended physical address to a first hardware physical address and a second hardware physical address, respectively, wherein the first hardware physical address is adjacent to the second hardware physical address; determining statuses of a first switch and a second switch corresponding to the first hardware physical address and the second physical hardware address, respectively; and controlling the at least one function circuit according to the statuses of the first switch and the second switch.

According to another aspect of the present invention, a hardware control system for an operating system to control at least one function circuit is provided. The hardware control system includes a first converting circuit, a second converting circuit and an analyzing circuit. The first converting circuit converts a first virtual address and a second virtual circuit from the operating system to a first intermediate address and a second intermediate address, respectively. The second converting circuit converts the first intermediate address and the second intermediate address to a first extended physical address and a second extended physical address, respectively, wherein a starting position of the first extended physical address is spaced by a gap from a starting position of the second extended physical address. The analyzing circuit converts the first extended physical address and the second extended physical address to a first hardware physical address and a second hardware physical address, respectively. The analyzing circuit further determines statuses of a first switch and a second switch corresponding to the first hardware physical address and the second hardware physical address, respectively, and controls the at least one function circuit according to the statuses of the first switch and the second switch.

The above and other aspects of the invention will become better understood with regard to the following detailed description of the preferred but non-limiting embodiments. The following description is made with reference to the accompanying drawings.

DETAILED DESCRIPTION OF THE INVENTION

Various implementation approaches of a hardware control method and a hardware control system are described in the following embodiments. By using a design of extended physical addresses, a control command provided by an operating system activates only one switch but not other expectantly disabled switches, thus avoiding information security loopholes.

Figure 3:
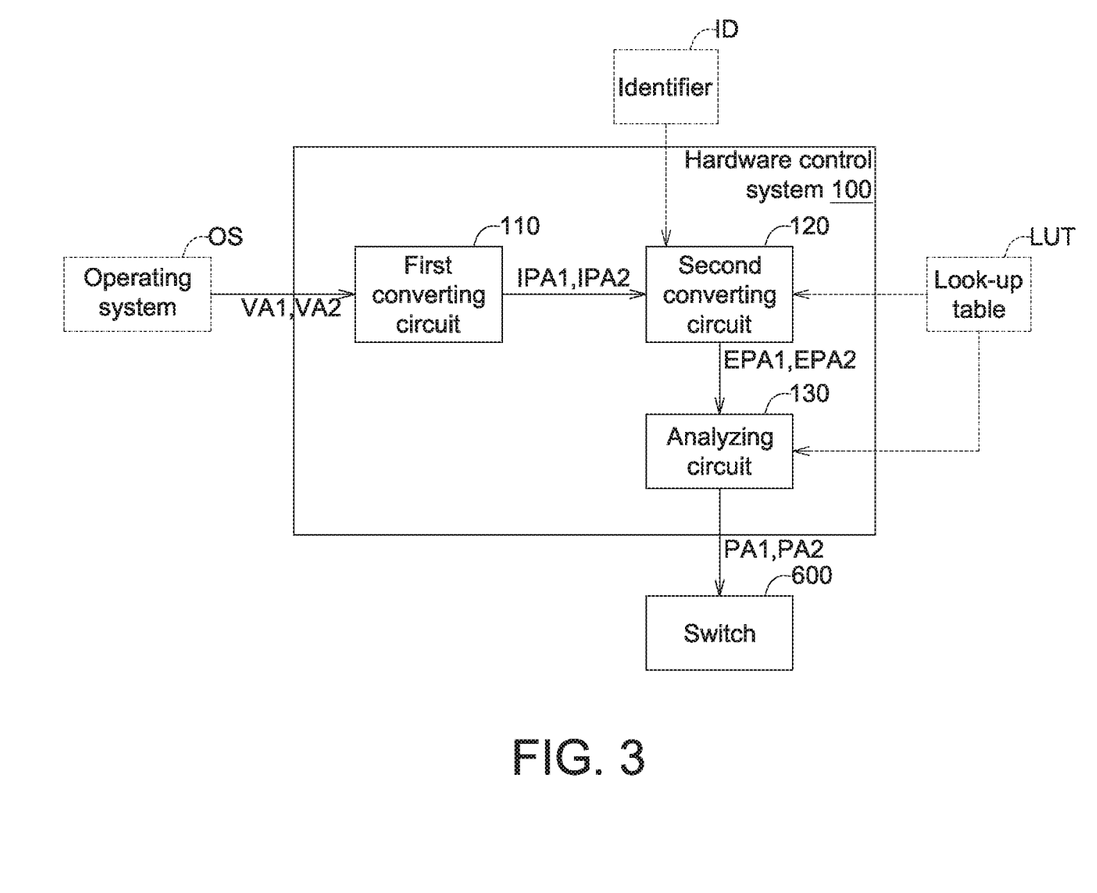
FIG. 3 is a schematic diagram of a hardware control system for a switch according to an embodiment of the present invention.

FIG. 3 shows a schematic diagram of a hardware control system 100 for a switch controlled by a virtual machine. The hardware control system 100 includes a first converting circuit 110, a second converting circuit 120 and an analyzing circuit 130. The first converting circuit 110, the second converting circuit 120 and the analyzing circuit 130 are, for example, a circuit module in a chip, a circuit board, a firmware circuit or a chip. Operation details the above components are given with the accompanying flowcharts.

Figure 4:
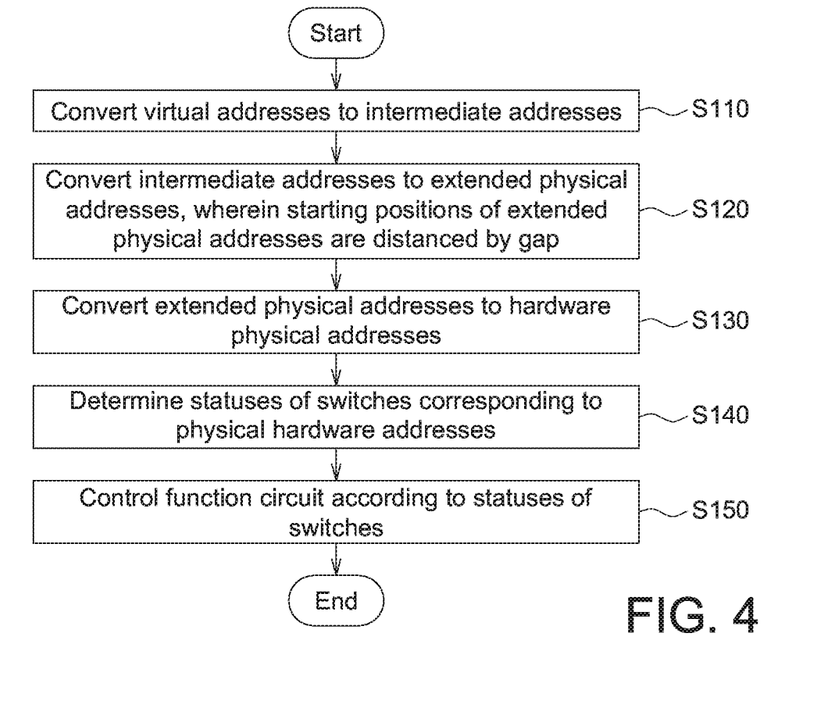
FIG. 4 is a flowchart of a hardware control method for a switch according to an embodiment of the present invention.

FIG. 4 shows a flowchart of a hardware control method for a switch according to an embodiment of the present invention. In step S110, the first converting circuit 110 converts two virtual addresses VA1 and VA2 to two intermediate addresses IPA1 and IPA2, respectively. The virtual addresses VA1 and VA2 are generated by a virtual machine (not shown) according to a command of an operating system OS.

The first converting circuit 110 sends the intermediate addresses IPA1 and IPA2 to the second converting circuit 120.

Figure 5:
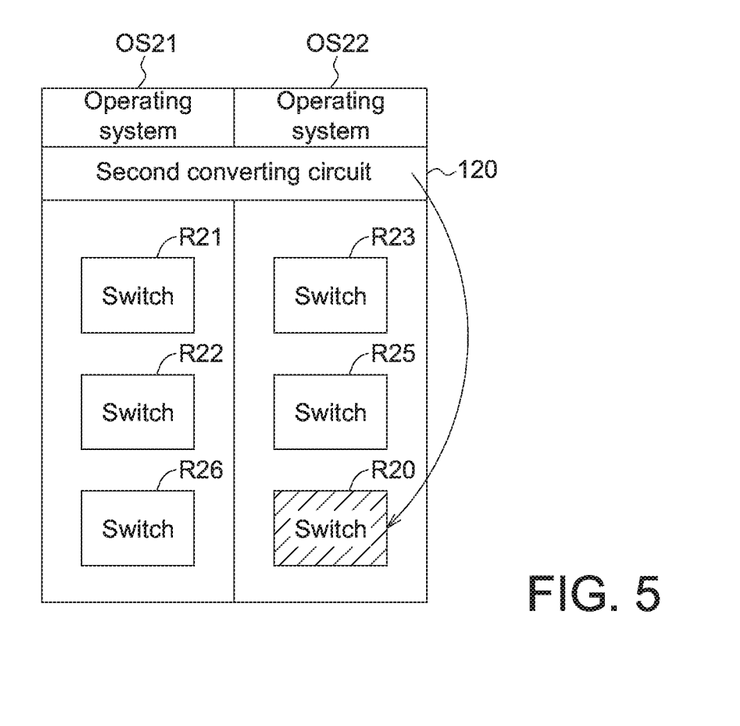
FIG. 5 is a corresponding relationship between operating systems and switches.

In step S120, the second converting circuit 120 performs searching according to the intermediate addresses IPA1 and IPA2 and an identifier ID of the operating system OS, so as to convert the intermediate addresses IPA1 and IPA2 to two extended physical addresses EPA1 and EPA2, respectively. A starting position of the extended physical address EPA1 is spaced by a gap GP (shown in FIG. 6) from a starting position of the extended physical address EPA2. FIG. 5 shows a schematic diagram of a corresponding relationship between operating systems OS21 and OS22 and switches R20, R21, R22, R23, R25 and R26. Each of the switches R20, R21, R22, R23, R25 and R26 corresponds to some or all of the functions of specific function circuits. The switches R20, R21, R22, R23, R25 and R26 may be a memory or a register. The operating system OS21 corresponds to function circuits available thereto, and is permitted to use the switches R21, R22 and R26; the operating system OS22 corresponds to function circuits available thereto, and is permitted to use the switches R23, R25 and R20.

Figure 6:
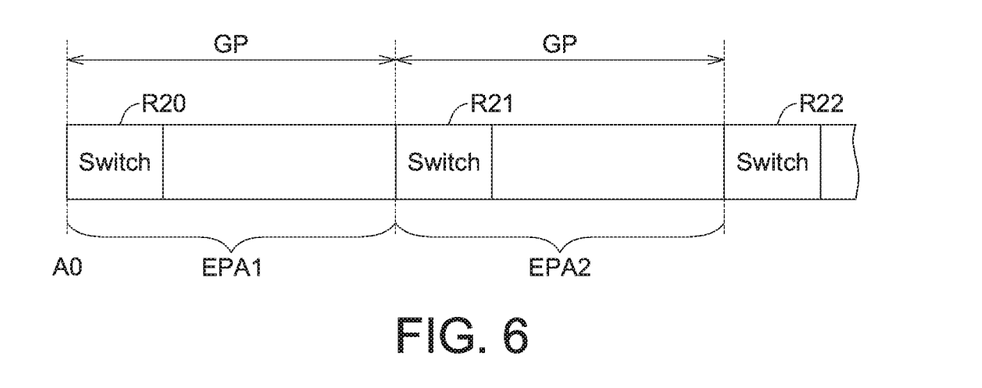
FIG. 6 is a mapping diagram of switches and extended physical addresses.

In this embodiment, the second converting circuit 120 learns according to the virtual address VA1 provided by the operating system OS22 that the switch R20 is permitted to be used. FIG. 6 shows a mapping diagram of the switches R20, R21 and R22 and the extended physical address EPA1. The extended physical address EPA1 corresponds to the switch R20 distanced by the gap GP, wherein the gap GP is greater than a page size of the second converting circuit 120, i.e., 4 KB. As such, the extended physical address EPA1 corresponds to only one switch (e.g., the above switch R20) but does not correspond to the expectantly disabled switches R21 and R22. In this step, the second converting circuit 120 may convert the intermediate address IPA1 to the extended physical address EPA1 according to a look-up table LUT, wherein the look-up table LUT may be written by the virtual machine during booting. It should be noted that, in this embodiment, the hardware physical address corresponding to each of the switches R20, R21, R22, R23, R25 and R26 does not change, whereas the length the extended physical address EPA corresponding to each of the switches R20, R21, R22, R23, R25 and R26 is the gap GP.

Alternatively, in another embodiment, the second converting circuit 120 may convert the intermediate addresses IPA1 and IPA2 to the extended physical addresses EPA1 and EPA2 through a calculation equation.

Figure 7:
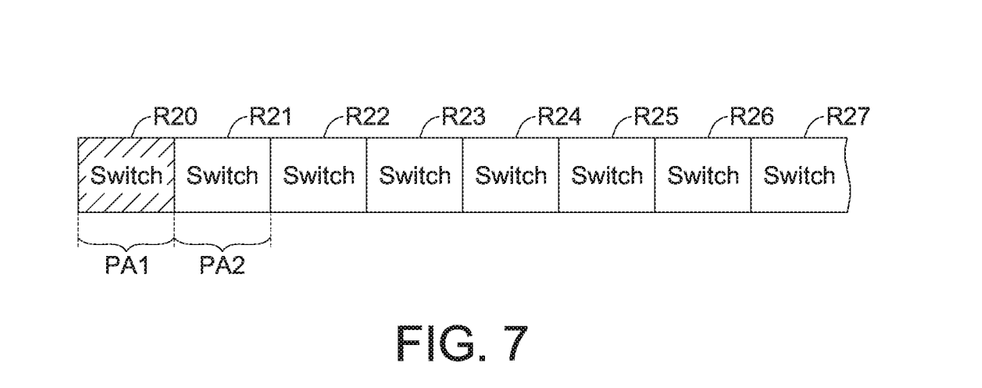
FIG. 7 is a mapping diagram of switches and hardware physical addresses.

In step S130, the analyzing circuit 130 converts the extended physical addresses EPA1 and EPA2 to two hardware physical addresses PA1 and PA2, respectively. FIG. 7 shows a mapping diagram of the switches R20 to R27 and the hardware physical addresses PA1 and PA2. The analyzing circuit 130 can convert the extended physical addresses EPA1 and EPA2 to the hardware physical addresses PA1 and PA2 each corresponding to only one switch. In this step, the analyzing circuit 130 can convert the extended physical addresses EPA1 and EPA2 to the hardware physical addresses PA1 and PA2 according to the look-up table LUT. Alternatively, in another embodiment, the analyzing circuit 130 may convert the extended physical addresses EPA1 and EPA2 to the hardware physical addresses PA1 and PA2 through a calculation equation.

In step S140, the analyzing circuit 130 determines statuses of the switches R20 and R21 corresponding to the hardware physical addresses PA1 and PA2, respectively.

In step S150, the analyzing circuit 130 controls at least one function circuit according to the statuses of the switches R20 and R21. The relationship between the switch and the function circuit may be a one-on-one relationship, a multiple-on-one relationship or a multiple-on-multiple relationship.

As shown in FIG. 3, through the hardware physical address PA1, the corresponding switch 600 can be activated, thus further operating a function circuit (not shown) corresponding to the switch 600.

Hence, with the design of the extended physical address EPA1, the control command provided by the operating system OS activates only one switch permitted to be used without activating other expectantly disabled switches, thus avoiding information security loopholes and resolving the issue of the prior art.

Figure 8:
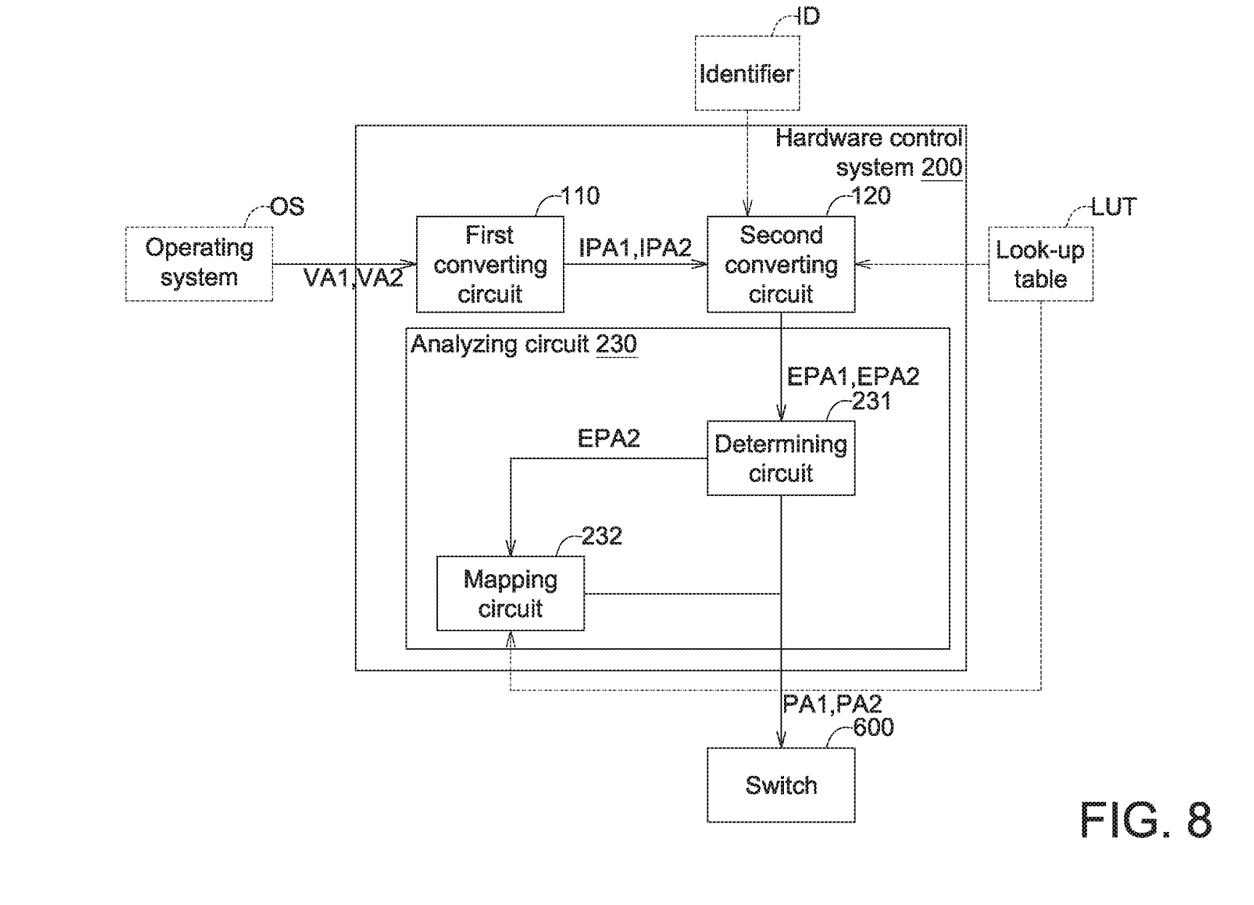
FIG. 8 is a schematic diagram of a hardware control system for a switch controlled by a virtual machine according to another embodiment of the present invention.

FIG. 8 shows a schematic diagram of a hardware control system 200 for a switch according to another embodiment of the present invention. In this embodiment, an analyzing circuit 230 includes a determining circuit 231 and a mapping circuit 232. The remaining details are the same and are omitted herein.

Figure 9:
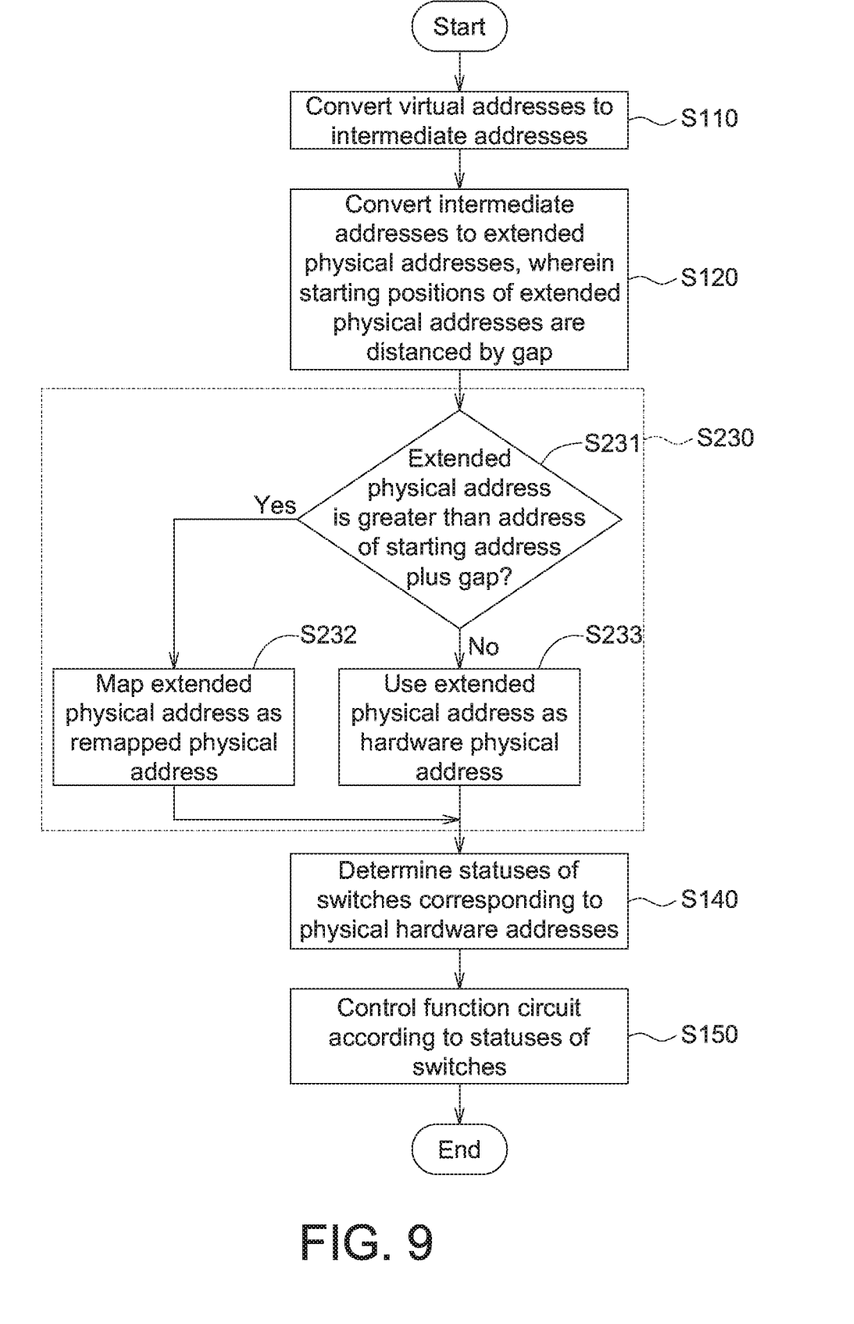
FIG. 9 is a flowchart of a hardware control method for a switch controlled by a virtual machine according to another embodiment of the present invention.

FIG. 9 shows a flowchart of a hardware control method for a switch according to another embodiment of the present invention. In this embodiment, step S230 of converting the extended physical addresses EPA1 and EPA2 to the hardware physical addresses PA1 and PA2 includes steps S231, S232 and S233.

As shown in FIG. 6, the first extended physical address EPA1 and the second extended physical addresses EPA2 have a common starting address A0. In step S231, the determining circuit 231 determines whether the extended physical addresses EPA1 and EPA2 are greater than an address of the starting address A0 plus the gap GP. If the extended physical addresses EPA1 and EPA2 are greater than the address of the starting address A0 plus the gap GP, step S232 is performed. If the extended physical addresses EPA1 and EPA2 are not greater than the address of the starting address A0 plus the gap GP, step S233 is performed. Because the extended physical addresses of the second switches and other switches onwards, i.e., the switches R21 to R27 (e.g., the extended physical address EPA2) are each spaced by the gap GP, only the extended physical address EPA1 corresponding to the first switch R20 is not changed. If the extended physical address EPA1 is not greater than the address of the starting address A0 plus the gap GP, it means that the extended physical address EPA1 corresponds to the first switch R20.

In step S233, the analyzing circuit 230 directly uses the extended physical address EPA1 as the hardware physical address PA1.

In step S232, the determining circuit 231 sends the extended physical address EPA2 to a mapping circuit 232. The mapping circuit 232 maps the extended physical address EPA2 as a remapped physical address, and the analyzing circuit 230 uses the remapped physical address as the hardware physical address PA2.

That is to say, when the extended physical address EPA1 corresponds to the first switch R20, no conversion is required, hence accelerating the processing speed.

A design of the extended physical addresses EPA1 and EPA2 is provided in the above embodiments, allowing the control command provided by the operating system OS to activate only one switch permitted to be used without activating other expectantly disabled switches, thus avoiding information security loopholes.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hardware control method, for an operating system to control at least one function circuit, the hardware control method comprising:
    converting a first virtual address and a second virtual address from the operating system to a first intermediate address and a second intermediate address, respectively;
    converting the first intermediate address and the second intermediate address to a first extended physical address and a second extended physical address, respectively, wherein a starting position of the first extended physical address is spaced by a gap from a starting point of the second extended physical address;
    converting the first extended physical address and the second extended physical address to a first hardware physical address and a second hardware physical address, respectively, wherein the first hardware physical address is adjacent to the second hardware physical address;
    determining statuses of a first switch and a second switch corresponding to the first hardware physical address and the second hardware physical address, respectively; and
    controlling the at least one function circuit according to the statuses of the first switch and the second switch.

2. The hardware control method according to claim 1, wherein the first extended physical address corresponds to only one of the first switch, and the second extended physical switch corresponds to only one of the second switch.

3. The hardware control method according to claim 1, wherein the first extended physical address and the second extended physical address have a common starting address, the hardware control method further comprising:
    determining whether the first extended physical address is greater than an address of the starting address plus the gap; and
    if the first extended physical address is not greater than the address of the starting address plus the gap, using the first extended physical address as the first hardware physical address in the converting the first extended physical address to the first hardware physical address.

4. The hardware control method according to claim 1, wherein the converting the first intermediate physical address to the first extended physical address is performed by a converting circuit, and the gap is greater than or equal to a page size of the converting circuit.

5. The hardware control method according to claim 1, wherein the gap is greater than or equal to 4 KB.

6. The hardware control method according to claim 1, wherein the converting the first intermediate address to the first extended physical address is performed according to a look-up table.

7. The hardware control method according to claim 6, wherein the virtual address is generated by the operating system through a virtual machine according to a command, and the look-up table is generated through the virtual machine.

8. The hardware control method according to claim 1, wherein the converting the first intermediate address to the first extended physical address is performed according to an identifier of the operating system.

9. The hardware control method according to claim 1, wherein the step of converting the first intermediate address to the first extended physical address is performed through a calculation equation.

10. A hardware control system, for an operating system to control at least one function circuit, the hardware control system comprising:
    a first converting circuit, converting a first virtual address and a second virtual address from the operating system to a first intermediate address and a second intermediate address, respectively;
    a second converting circuit, converting the first intermediate address and the second intermediate address to a first extended physical address and a second extended physical address, respectively, wherein a starting position of the first extended physical address is spaced by a gap from a starting point of the second extended physical address;
    an analyzing circuit, converting the first extended physical address and the second extended physical address to a first hardware physical address and a second hardware physical address, respectively, wherein the first hardware physical address is adjacent to the second hardware physical address; and
    the analyzing circuit further determining statuses of a first switch and a second switch corresponding to the first hardware physical address and the second hardware physical address, respectively, and controlling the at least one function circuit according to the statuses of the first switch and the second switch.

11. The hardware control system according to claim 10, wherein the first extended physical address corresponds to only one of the first switch, and the second extended physical switch corresponds to only one of the second switch.

12. The hardware control system according to claim 10, wherein the first extended physical address and the second extended physical address have a common starting address, and the analyzing circuit comprises:

a determining circuit, determining whether the first extended physical address is greater than an address of the starting address plus the gap; and if the first extended physical address is not greater than the address of the starting address plus the gap, the determining circuit using the first extended physical address as the first hardware physical address.

13. The hardware control system according to claim 10, wherein the gap is greater than or equal to a page size of the second converting circuit.

14. The hardware control system according to claim 10, wherein the gap is greater than or equal to 4 KB.

15. The hardware control system according to claim 10, wherein the second converting circuit converts the first intermediate address to the first extended physical address according to a look-up table.

16. The hardware control system according to claim 15, wherein the virtual address is generated by the operating system through a virtual machine according to a command, and the look-up table is generated through the virtual machine.

17. The hardware control system according to claim 10, wherein the second converting circuit performs conversion according to an identifier corresponding to the operating system.

18. The hardware control system according to claim 10, wherein the second converting circuit converts the first intermediate address to the first extended physical address through a calculation equation.

* * * * *